United States Patent
Hoffman

(10) Patent No.: US 10,947,983 B2
(45) Date of Patent: Mar. 16, 2021

(54) AXIAL FAN BLOWER

(71) Applicant: TTI (Macao Commercial Offshore) Limited, Macau (MO)

(72) Inventor: Ronald J. Hoffman, Iva, SC (US)

(73) Assignee: TTI (Macao Commercial Offshore) Limited, Macau (MO)

( * ) Notice: Subject to any disclaimer, the term of this patent is extended or adjusted under 35 U.S.C. 154(b) by 0 days.

(21) Appl. No.: 16/525,285

(22) Filed: Jul. 29, 2019

(65) Prior Publication Data

US 2019/0353171 A1 Nov. 21, 2019

Related U.S. Application Data

(63) Continuation of application No. 15/501,145, filed as application No. PCT/US2016/046448 on Aug. 11, 2016, now abandoned.

(Continued)

(51) Int. Cl.
*F04D 19/00* (2006.01)
*F04D 19/02* (2006.01)
(Continued)

(52) U.S. Cl.
CPC ........... *F04D 19/007* (2013.01); *A01G 20/43* (2018.02); *A01G 20/47* (2018.02); *F04D 19/002* (2013.01);
(Continued)

(58) Field of Classification Search
CPC ...... F04D 19/002; F04D 19/007; F04D 19/02; F04D 25/08; F04D 25/084; F04D 25/086;
(Continued)

(56) References Cited

U.S. PATENT DOCUMENTS

| 2,175,641 A | 10/1939 | Replogle |
| 2,198,735 A | 4/1940 | Morrison |

(Continued)

FOREIGN PATENT DOCUMENTS

| GB | 191103740 A | 6/1911 |
| GB | 566686 A | 1/1945 |

(Continued)

OTHER PUBLICATIONS

International Search Report and Written Opinion for Application No. PCT/US2016/037168 dated Mar. 27, 2017 (14 pages).

(Continued)

*Primary Examiner* — John M Zaleskas
(74) *Attorney, Agent, or Firm* — Michael Best & Friedrich LLP

(57) ABSTRACT

A blower includes a first fan stage with a first housing that has a first plurality of stationary vanes and a first fan that has a first plurality of blades extending radially outwardly from a first hub. The first housing includes a first axial end and a second axial end opposite the first axial end. The blower also includes a second fan stage coupled to the first fan stage. The second fan stage includes a second housing with a second plurality of stationary vanes and a second fan that has a second plurality of blades extending radially outwardly from a second hub. The second fan stage includes a third axial end and a fourth axial end opposite the third axial end. The first hub and/or the second hub has a frustoconical shape that converges from the first axial end toward the fourth axial end.

15 Claims, 14 Drawing Sheets

Related U.S. Application Data

(60) Provisional application No. 62/174,561, filed on Jun. 12, 2015.

(51) Int. Cl.
| | | |
|---|---|---|
| *F04D 29/54* | (2006.01) | |
| *A01G 20/47* | (2018.01) | |
| *F04D 29/32* | (2006.01) | |
| *A01G 20/43* | (2018.01) | |

(52) U.S. Cl.
CPC .......... *F04D 19/02* (2013.01); *F04D 29/325* (2013.01); *F04D 29/329* (2013.01); *F04D 29/542* (2013.01); *F04D 29/544* (2013.01)

(58) Field of Classification Search
CPC ..... F04D 29/542; F04D 29/544; A01G 20/43; A01G 20/47
USPC ............................. 415/198.1, 199.4, 208.2
See application file for complete search history.

(56) References Cited

U.S. PATENT DOCUMENTS

| | | | |
|---|---|---|---|
| 2,292,453 A * | 8/1942 | La Mere | B26B 13/00 |
| | | | 30/216 |
| 2,446,552 A * | 8/1948 | Redding | F04D 17/025 |
| | | | 415/194 |
| 2,488,945 A * | 11/1949 | Troller | F04D 19/002 |
| | | | 417/423.14 |
| 3,066,850 A * | 12/1962 | Ira | F04D 29/644 |
| | | | 417/353 |
| 3,084,850 A | 4/1963 | Engalitcheff, Jr. | |
| 4,132,507 A | 1/1979 | Akiyama et al. | |
| 4,219,325 A | 8/1980 | Gutzwiller | |
| 4,400,140 A | 8/1983 | Papst | |
| 4,413,371 A | 11/1983 | Tuggle et al. | |
| 4,590,918 A * | 5/1986 | Kuboyama | F26B 21/00 |
| | | | 126/247 |
| 4,678,400 A * | 7/1987 | Kuboyama | F24V 40/00 |
| | | | 415/199.4 |
| 4,734,017 A | 3/1988 | Levin | |
| 4,780,052 A | 10/1988 | Pradelle | |
| 4,794,225 A * | 12/1988 | Maese | A45D 20/12 |
| | | | 34/97 |
| 4,884,314 A | 12/1989 | Miner et al. | |
| 4,981,414 A * | 1/1991 | Sheets | F01D 5/145 |
| | | | 415/149.1 |
| 5,257,913 A | 11/1993 | Schwarzer et al. | |
| 5,839,205 A * | 11/1998 | Hung | F04D 17/165 |
| | | | 34/97 |
| 5,841,943 A * | 11/1998 | Nosenchuck | A45D 20/10 |
| | | | 392/385 |
| 6,011,903 A | 1/2000 | Nosenchuck | |
| 6,105,206 A * | 8/2000 | Tokumaru | A47L 5/14 |
| | | | 15/344 |
| 6,296,459 B1 | 10/2001 | Saputo et al. | |
| 6,511,300 B2 | 1/2003 | Otsuka | |
| 6,565,334 B1 * | 5/2003 | Bradbury | F04D 29/384 |
| | | | 361/695 |
| 6,896,478 B2 | 5/2005 | Botros et al. | |
| 7,238,004 B2 * | 7/2007 | Lin | F01D 1/02 |
| | | | 415/182.1 |
| 7,739,773 B2 | 6/2010 | Schliemann et al. | |
| 7,845,048 B1 | 12/2010 | Bailey et al. | |
| 7,896,612 B2 | 3/2011 | Schliemann et al. | |
| 8,241,011 B2 | 8/2012 | Huang | |
| 8,316,506 B1 | 11/2012 | Spalj | |
| 8,616,842 B2 | 12/2013 | Avedon | |
| 8,894,382 B2 | 11/2014 | Binder | |
| 8,918,956 B2 | 12/2014 | Pellenc | |
| 8,936,434 B2 | 1/2015 | Peterson et al. | |
| 8,967,983 B2 | 3/2015 | Kampf | |
| 2002/0122733 A1 * | 9/2002 | Lin | F04D 19/007 |
| | | | 417/423.5 |
| 2006/0096118 A1 | 5/2006 | Ward, III et al. | |
| 2007/0140844 A1 * | 6/2007 | Yoshida | F04D 29/544 |
| | | | 415/220 |
| 2008/0089785 A1 * | 4/2008 | Schliemann | E01H 1/0809 |
| | | | 415/208.1 |
| 2008/0124232 A1 * | 5/2008 | Lee | F04D 19/007 |
| | | | 417/423.5 |
| 2008/0138199 A1 * | 6/2008 | Chang | F04D 19/007 |
| | | | 415/199.5 |
| 2009/0155104 A1 | 6/2009 | Takeshita et al. | |
| 2010/0172750 A1 * | 7/2010 | Mugnier | F04D 17/025 |
| | | | 415/199.4 |
| 2011/0052433 A1 * | 3/2011 | Huang | F04D 19/007 |
| | | | 417/423.5 |
| 2012/0076672 A1 * | 3/2012 | Binder | F04D 25/084 |
| | | | 417/234 |
| 2012/0138058 A1 | 6/2012 | Fu et al. | |
| 2012/0201668 A1 * | 8/2012 | Peterson | F04D 25/084 |
| | | | 415/208.2 |
| 2012/0219437 A1 * | 8/2012 | Nakamura | A47L 5/22 |
| | | | 417/423.1 |
| 2012/0222843 A1 * | 9/2012 | Mitchell | F24F 1/38 |
| | | | 165/104.34 |
| 2013/0052045 A1 * | 2/2013 | Harris | F04D 25/084 |
| | | | 417/53 |
| 2014/0050600 A1 | 2/2014 | Kodato et al. | |
| 2014/0079536 A1 * | 3/2014 | Chen | F04D 19/007 |
| | | | 415/115 |
| 2014/0140861 A1 | 5/2014 | Pellenc | |
| 2014/0230181 A1 | 8/2014 | Yamaoka et al. | |
| 2014/0234130 A1 | 8/2014 | Yamaoka et al. | |
| 2015/0023791 A1 * | 1/2015 | Sadi | F04D 29/666 |
| | | | 415/213.1 |
| 2015/0143657 A1 * | 5/2015 | Gindele | A47L 5/14 |
| | | | 15/330 |
| 2015/0211535 A1 | 7/2015 | Kodato et al. | |
| 2016/0040684 A1 * | 2/2016 | Hayashida | F04D 25/0646 |
| | | | 417/423.7 |
| 2016/0195097 A1 * | 7/2016 | Patrick | A01G 20/43 |
| | | | 415/124.2 |

FOREIGN PATENT DOCUMENTS

| | | |
|---|---|---|
| WO | 2000005540 A1 | 2/2009 |
| WO | 2009144257 A2 | 12/2009 |
| WO | 2011052560 A1 | 5/2011 |

OTHER PUBLICATIONS

International Search Report and Written Opinion for Application No. PCT/US2016/046448 dated Oct. 12, 2016 (14 pages).
European Patent Office Search Report for Application No. 16808539.7, dated May 6, 2019 (7 pages).

* cited by examiner

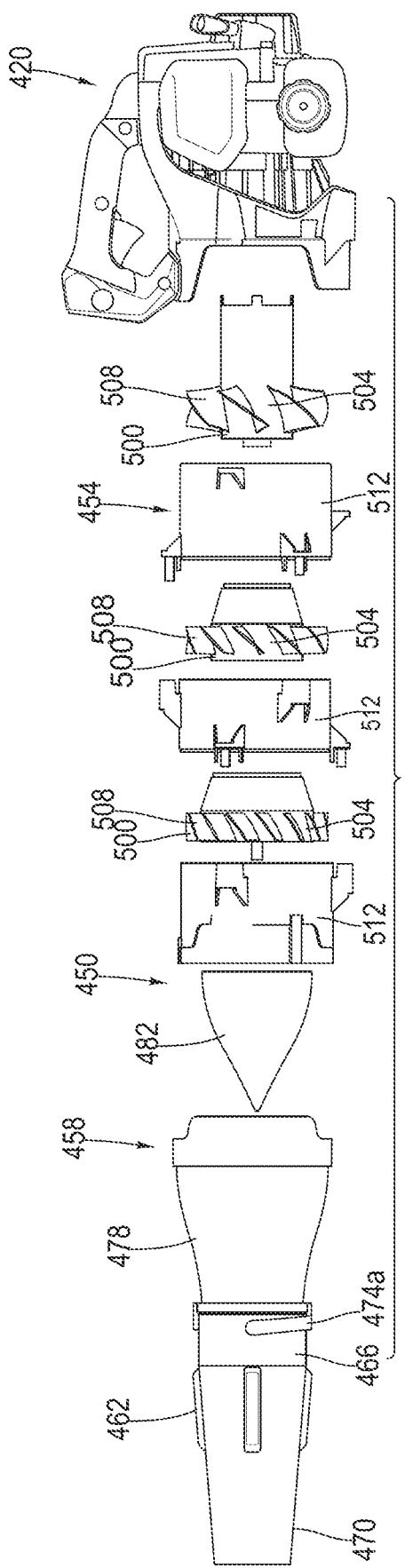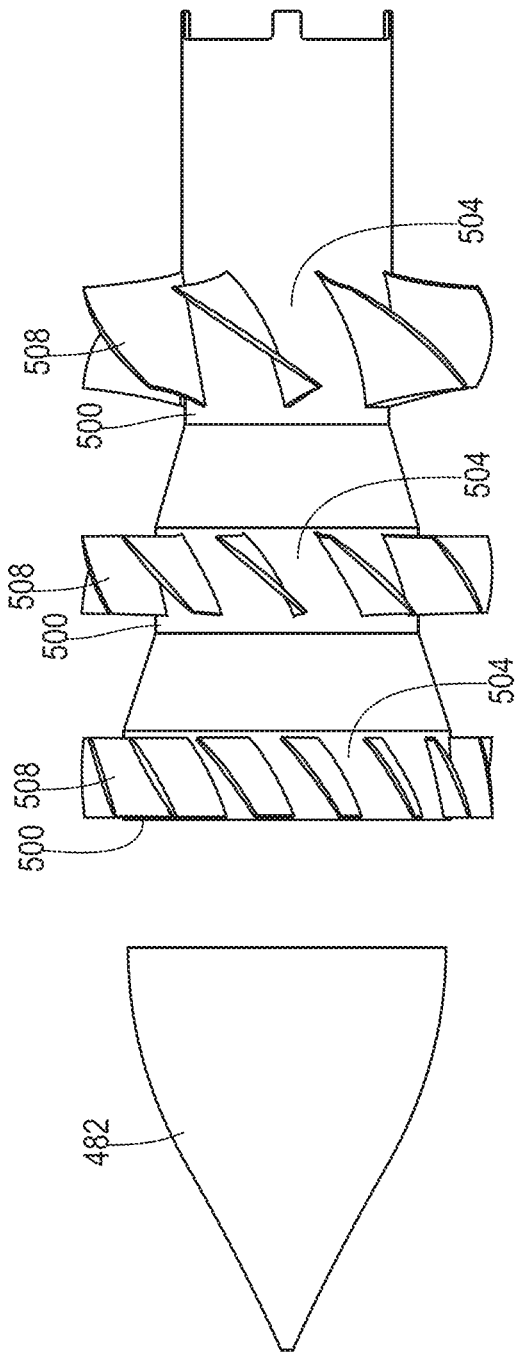
FIG. 11
FIG. 12

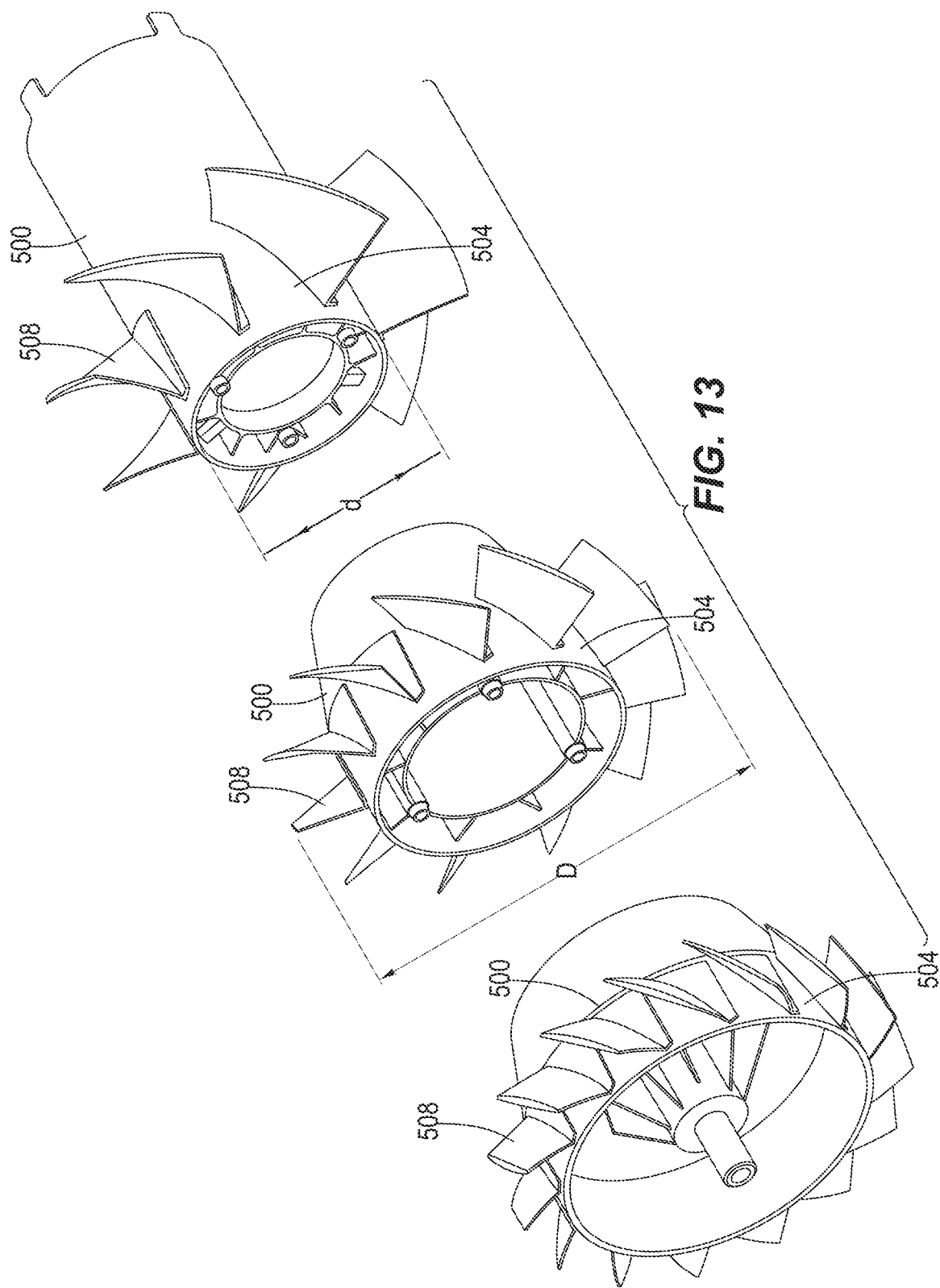

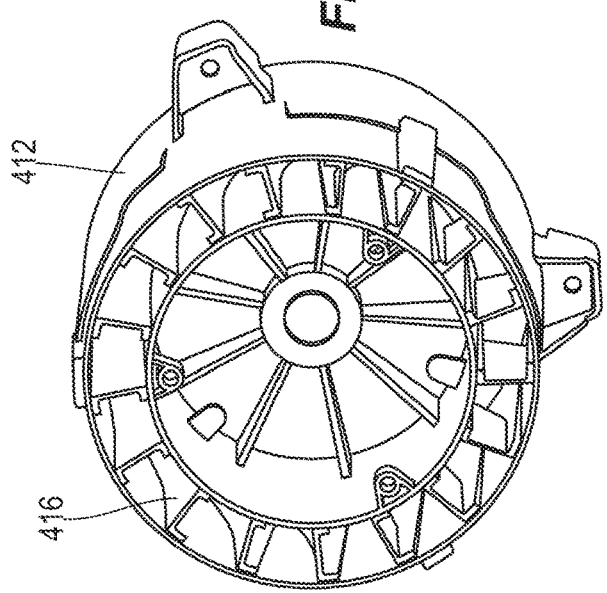
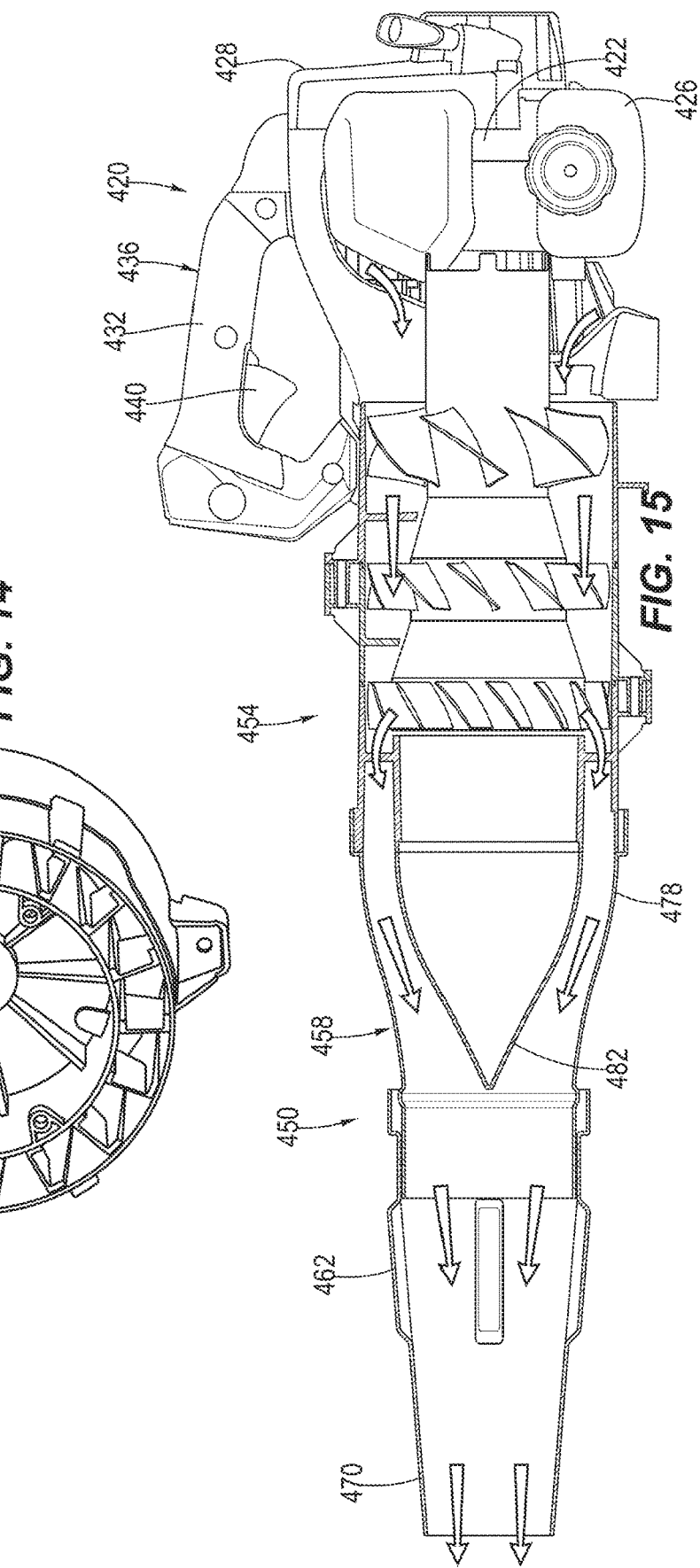

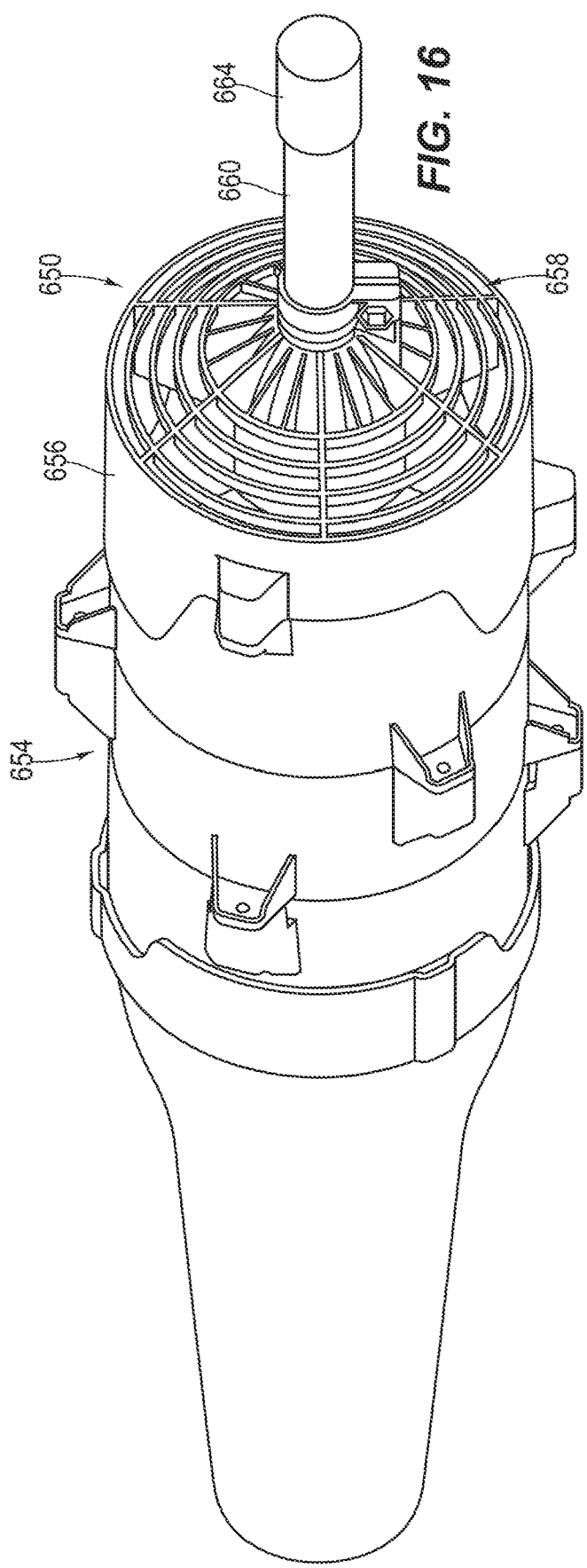
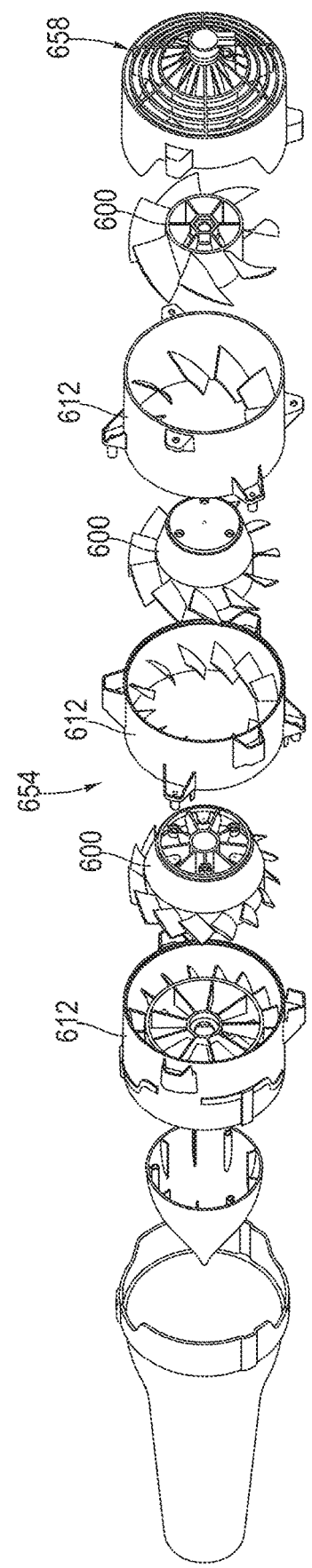

AXIAL FAN BLOWER

CROSS-REFERENCE TO RELATED APPLICATIONS

This application is a continuation of co-pending U.S. patent application Ser. No. 15/501,145, filed Feb. 1, 2017, which claims the benefit of International Application No. PCT/US2016/046448, filed Aug. 11, 2016, which claims priority to U.S. Provisional Patent Application No. 62/174,561, filed Jun. 12, 2015, the entire content of each of which is incorporated herein by reference.

BACKGROUND

The present invention relates to axial fan blowers and more particularly to an axial fan blower with a plurality of fan stages.

SUMMARY

The present invention provides, in one aspect, a blower including a main housing supporting a motor a fan assembly coupled to the main housing and operatively coupled to the motor. The fan assembly includes a first fan stage including a first housing section having a first plurality of stationary vanes and a first fan having a first plurality of blades extending radially outwardly from a first hub, and a second fan stage coupled to the first fan stage and including a second housing section having a second plurality of stationary vanes and a second fan having a second plurality of blades extending radially outwardly from a second hub. The second fan stage is not identical to the first fan stage. The blower also includes an air inlet, defined at least partially within the main housing, and an air outlet, defined by a tapered air outlet that is coupled to the fan assembly.

The present invention provides, in another aspect, a blower attachment including a rotatable input shaft operatively coupled to a fan assembly. The fan assembly includes a first fan stage including a housing section having a first plurality of stationary vanes and a first fan having a first plurality of blades extending radially outwardly from a first hub, and a second fan stage coupled to the first fan stage and including a housing section having a second plurality of stationary vanes and a second fan having a second plurality of blades extending radially outwardly from a second hub. The second fan stage is not identical to the first fan stage. The blower attachment also includes an air outlet, defined by a tapered air outlet that is coupled to the fan assembly.

The present invention provides, in another aspect, a blower including a main housing supporting a motor and at least partially defining an air inlet, and a fan assembly coupled to the main housing downstream from the air inlet and operatively coupled to the motor. The fan assembly includes a first fan stage including a first housing section coupled to the main housing and having a first plurality of stationary vanes and a first fan having a first plurality of blades extending radially outwardly from a first hub, a second fan stage coupled to the first fan stage and including a second housing section having a second plurality of stationary vanes and a second fan having a second plurality of blades extending radially outwardly from a second hub, and a third fan stage coupled to the second fan stage and including a third housing section having a third plurality of stationary vanes and a third fan having a third plurality of blades extending radially outwardly from a third hub. The first fan, the second fan, and the third fan each non-identical. The blower also includes a tapered air outlet disposed downstream from the fan assembly.

Other features and aspects of the invention will become apparent by consideration of the following detailed description, claims and accompanying drawings.

BRIEF DESCRIPTION OF THE DRAWINGS

FIG. 11 is an exploded view of the axial fan blower of FIG. 10.

FIG. 12 is a side view of a blower fan assembly with exterior housing portions removed.

FIG. 13 is a perspective view a plurality of fans of the blower fan assembly of FIG. 12, according to one construction of the invention.

FIG. 14 is a perspective view of a housing of the blower fan assembly.

FIG. 15 is a cross section of the axial fan blower shown in FIG. 10.

FIG. 16 is an exploded view of a blower fan assembly according to another embodiment of the invention.

FIG. 17 is a perspective view of an inlet housing of the blower fan assembly of FIG. 16.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

Figure 1:
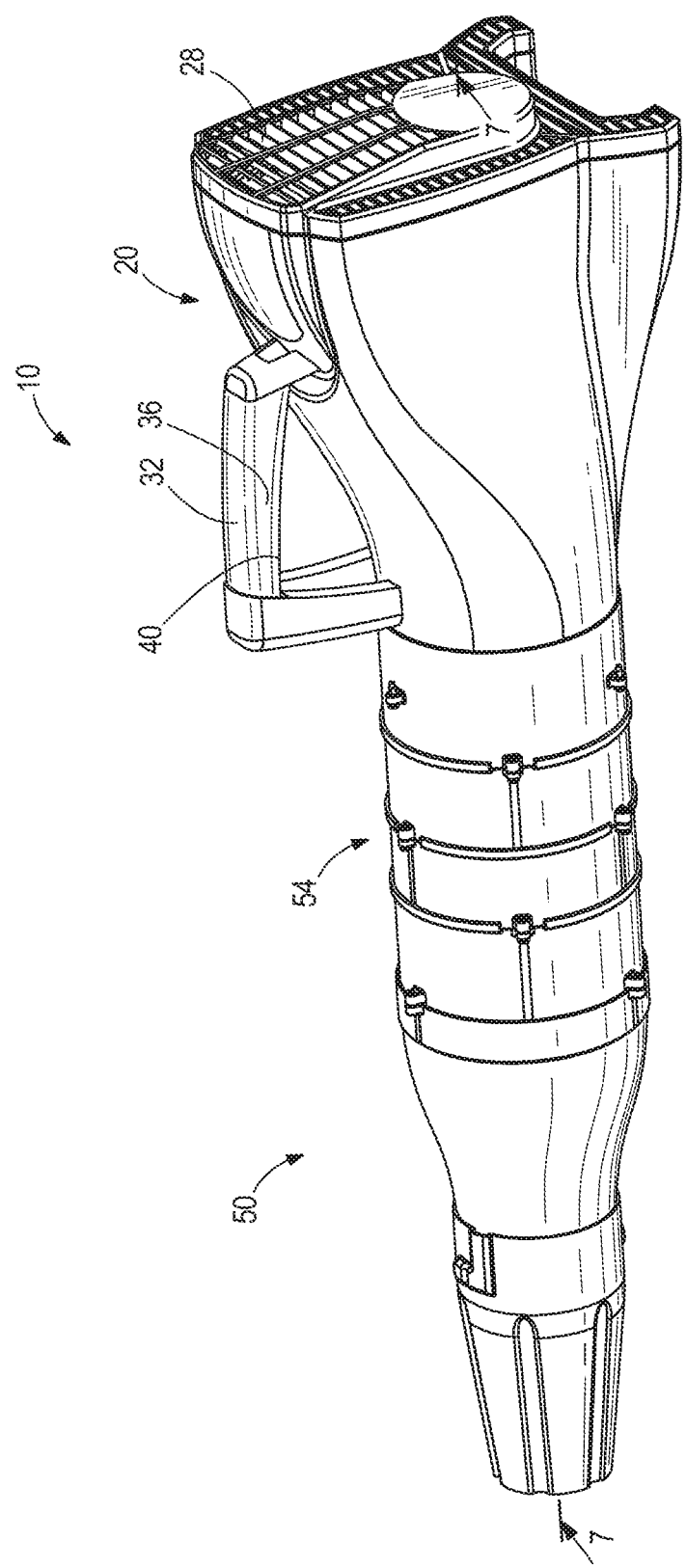
FIG. 1 is a perspective view of an axial fan blower.

FIG. 1 illustrates an axial fan blower 10 according to one construction of the invention. The axial fan blower 10 includes a power unit assembly 20 operatively coupled to a blower fan assembly 50 including a plurality of fan stages 54. In the illustrated embodiment, the blower fan assembly 50 includes four fan stages 54. However, in other embodiments, the blower fan assembly 50 may include two or more fan stages 54. As will be described in greater detail below, the axial fan blower 10 is configured to generate directed airflow using the fan stages 54 in which each stage 54 has a fan 100 including specific characteristic properties.

With continued reference to FIG. 1, the power unit assembly 20 includes a motor (not shown) supported within a main housing 24 having an air inlet 28 and a handle 32. The handle 32 includes a grip 36 having a trigger 40 operatively coupled to the motor. The motor, which may be an electric (AC or DC) or gas powered motor, includes a rotatable output shaft that is coupled to an input shaft 52 of the blower fan assembly 50.

Figure 2:
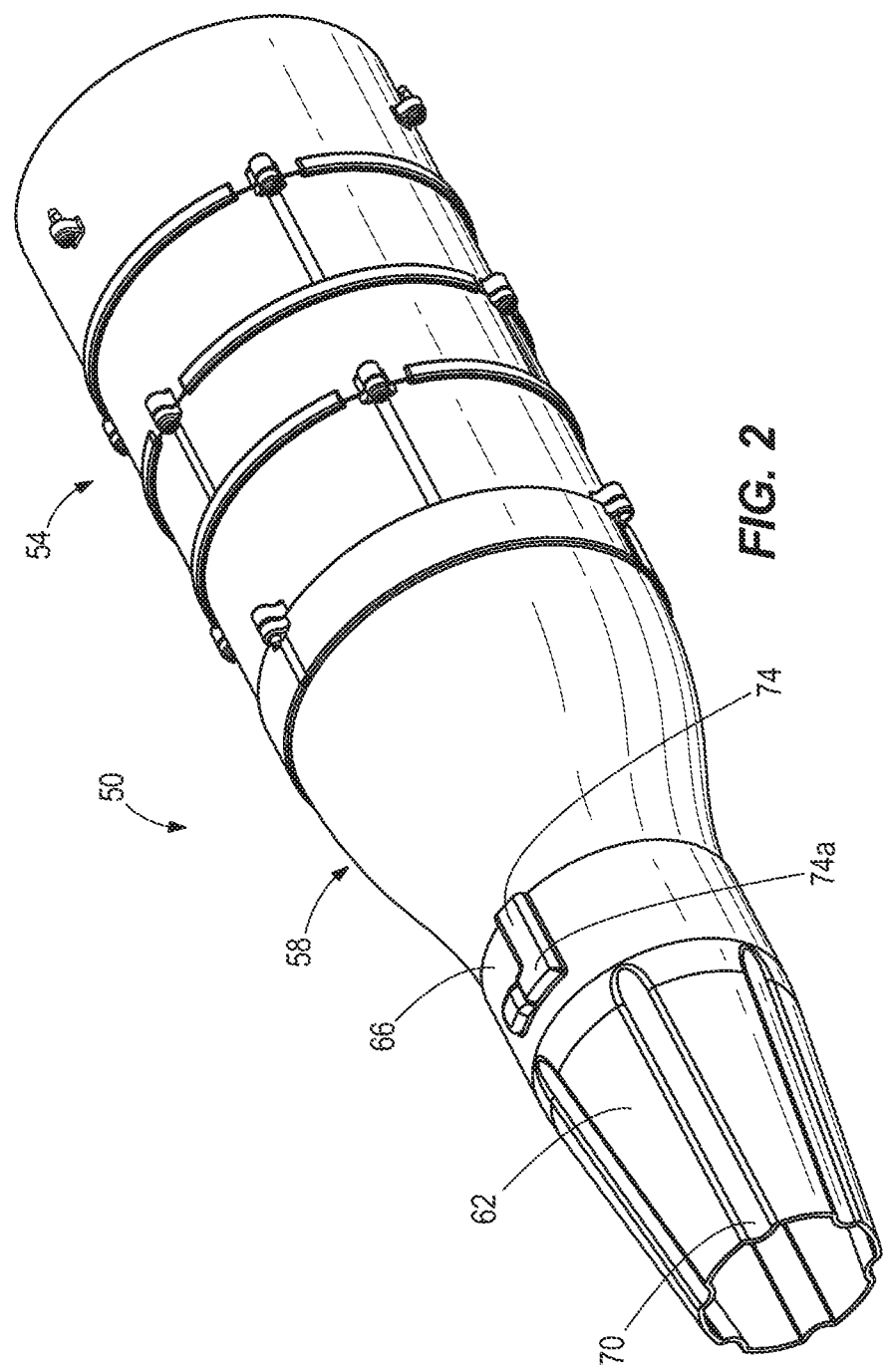
FIG. 2 is a perspective view of a blower fan assembly of the axial fan blower shown in FIG. 1.
Figure 3:
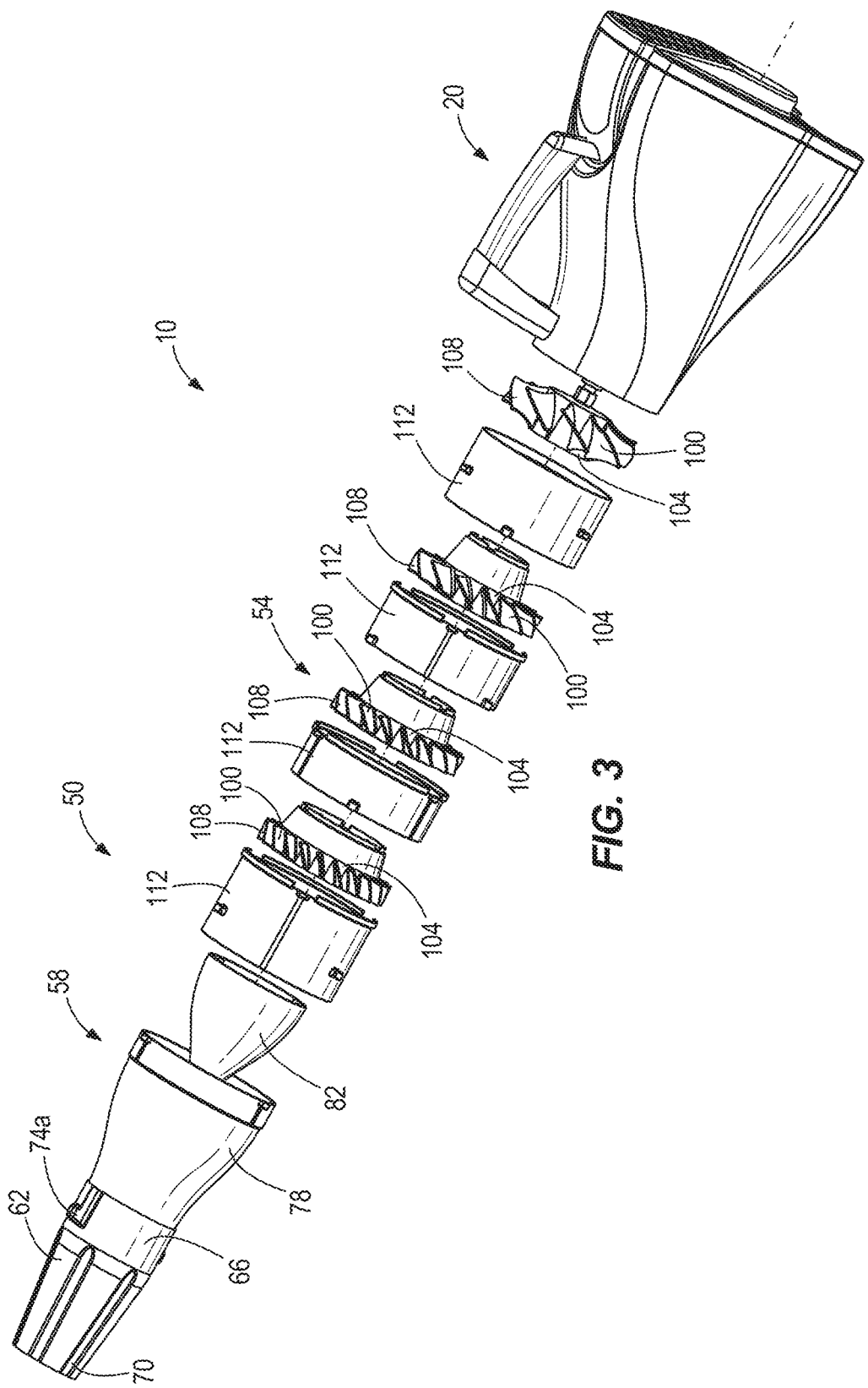
FIG. 3 is an exploded view of the axial fan blower of FIG. 1.

FIGS. 2 and 3 illustrate the blower fan assembly 50 that is coupled (or optionally detachably coupled) to the power unit assembly 20 and includes the plurality of fan stages 54, an air guide assembly 58, and a directed air outlet 62. In the illustrated embodiment, the fan stages 54 are coupled to the power unit assembly 20, and the air guide assembly 58 is disposed between and coupled to the fan stages 54 and the directed air outlet 62.

The directed air outlet 62 includes a first end 66 coupled to the air guide assembly 58 and a second end 70 that is preferably tapered relative to the first end 66. The directed air outlet 62 is detachably coupled to the air guide assembly 58 via at least one coupling member 74 disposed on the first end 66 of the directed air outlet 62. In this construction, the coupling member 74 is shown as a bayonet coupling, with a generally L-shaped slot 74a located on the directed air outlet 62 and a projection on the air guide assembly 58 configured to fit in the L-shaped slot 74a. However, other coupling features have been contemplated as useful.

The air guide assembly 58 includes a generally conical housing 78 disposed circumferentially about a guide cone 82 (FIGS. 3 and 4), where each of the conical housing 78 and the guide cone 82 are coupled to a housing 112 that includes an adjacent fan stage 54 by, for example, a set of fasteners 90. The conical housing 78 is radially spaced from the guide cone 82 to form an airflow pathway extending from the plurality of fan stages 54 to the directed air outlet 62. In general, the air guide assembly 58 is configured to assist in generating a high velocity, generally laminar airflow at the directed air outlet 62.

With reference to FIGS. 3-6, each of the fan stages 54 includes a fan 100 having a hub 104 and a plurality of blades 108 coupled to the hub 104. Each of the blades 108 defines an inside diameter d and an outside diameter D measured from the center of each hub 104 that cooperate to define an annular flow area. The hubs 104 of adjacent stages 54 are fixedly attached to one another and are coupled to the motor such that operation of the motor rotates the hubs 104 and blades 108. In the illustrated construction, the outside diameter D of the blades 108 of each of the stages 54 are equal (plus or minus 10%) while the inside diameter d of each stage 54 increases in the direction of blower flow. Thus, the annular flow area decreases in the direction of flow when the device is operated as a blower.

Figure 6:
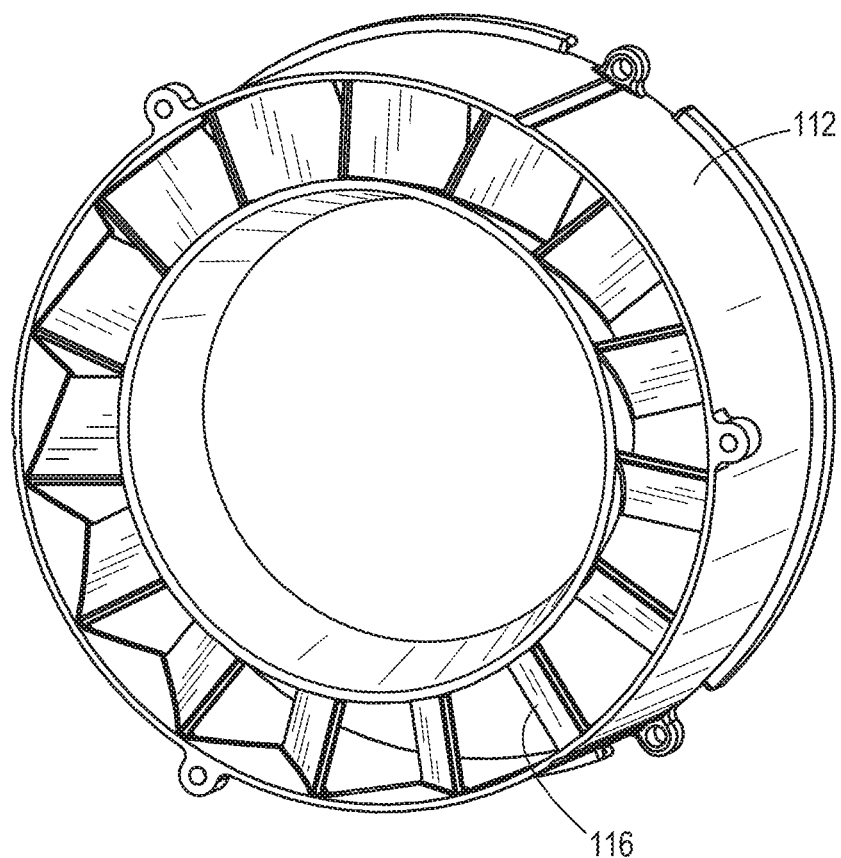
FIG. 6 is a perspective view of a housing of the blower fan assembly.

Each of the fan stages includes the housing 112 with each housing 112 having substantially the same outside diameter (FIGS. 2 and 3). The housings 112 are coupled to one another using any suitable attachment means. As shown in FIG. 6, each housing 112 includes a set of stationary guide vanes 116 that are formed as part of the housing 112 or attached to the housing 112. The guide vanes 116 are arranged to receive the air flow from the upstage rotating blades 108 and redirect that air toward the next rotating row of blades 108. Alternatively, the fan stage housing 112 may be formed as a two piece housing that extends the full length of the stages 54.

Figure 4:
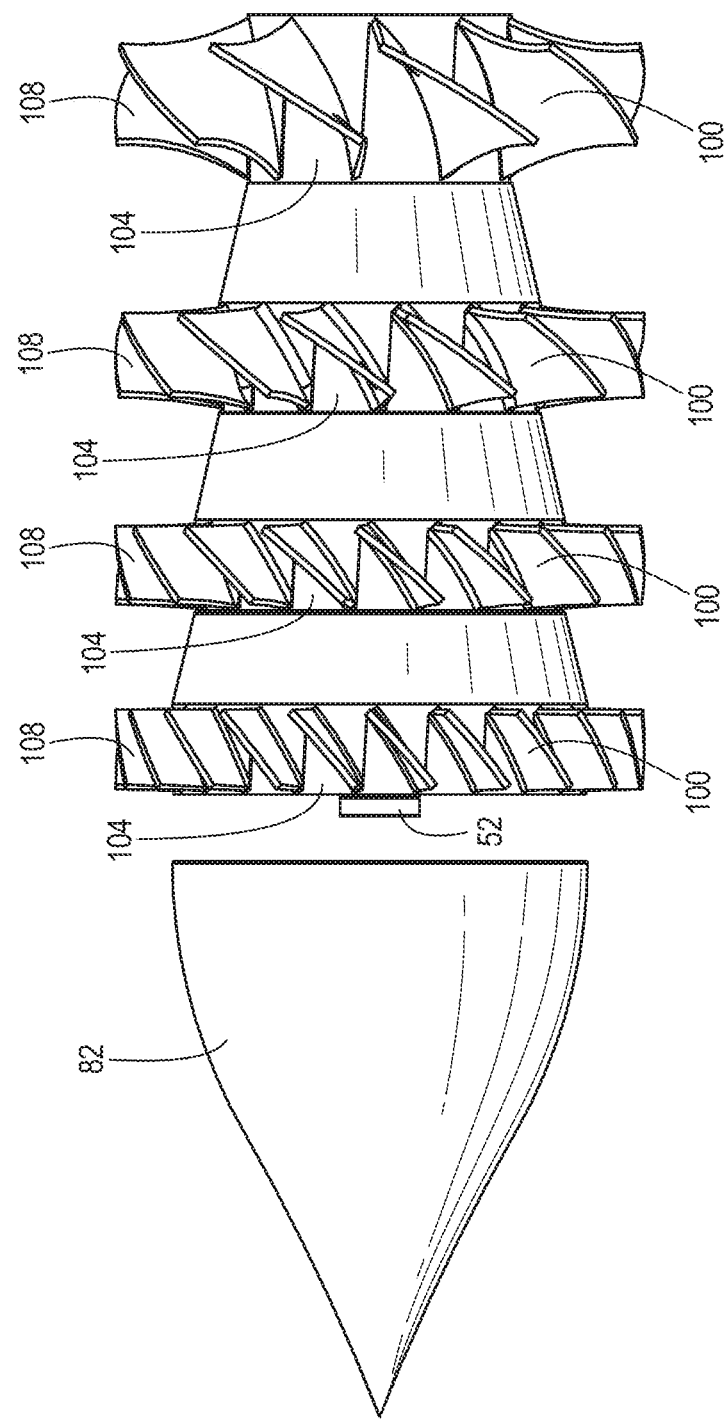
FIG. 4 is a side view of the blower fan assembly of FIG. 2 with exterior housing portions removed.

With continued reference to FIG. 4, the input shaft 52 of the blower fan assembly 50 extends through and is fixedly coupled to the fan 100 or hub 104 closest to the power unit assembly 20. Each fan 100 is also coupled to an adjacent fan 100 by a set of fasteners, thereby rotatably fixing the fans 100 relative to one another. As such, each fan 100 will rotate at the same speed upon rotation of the input shaft 52. In other constructions, the input shaft 52 may extend only part way through the fans 100 or may connect to a fan 100 other than the fan 100 closest to the power unit assembly 20 or to multiple fans 100.

Figure 5:
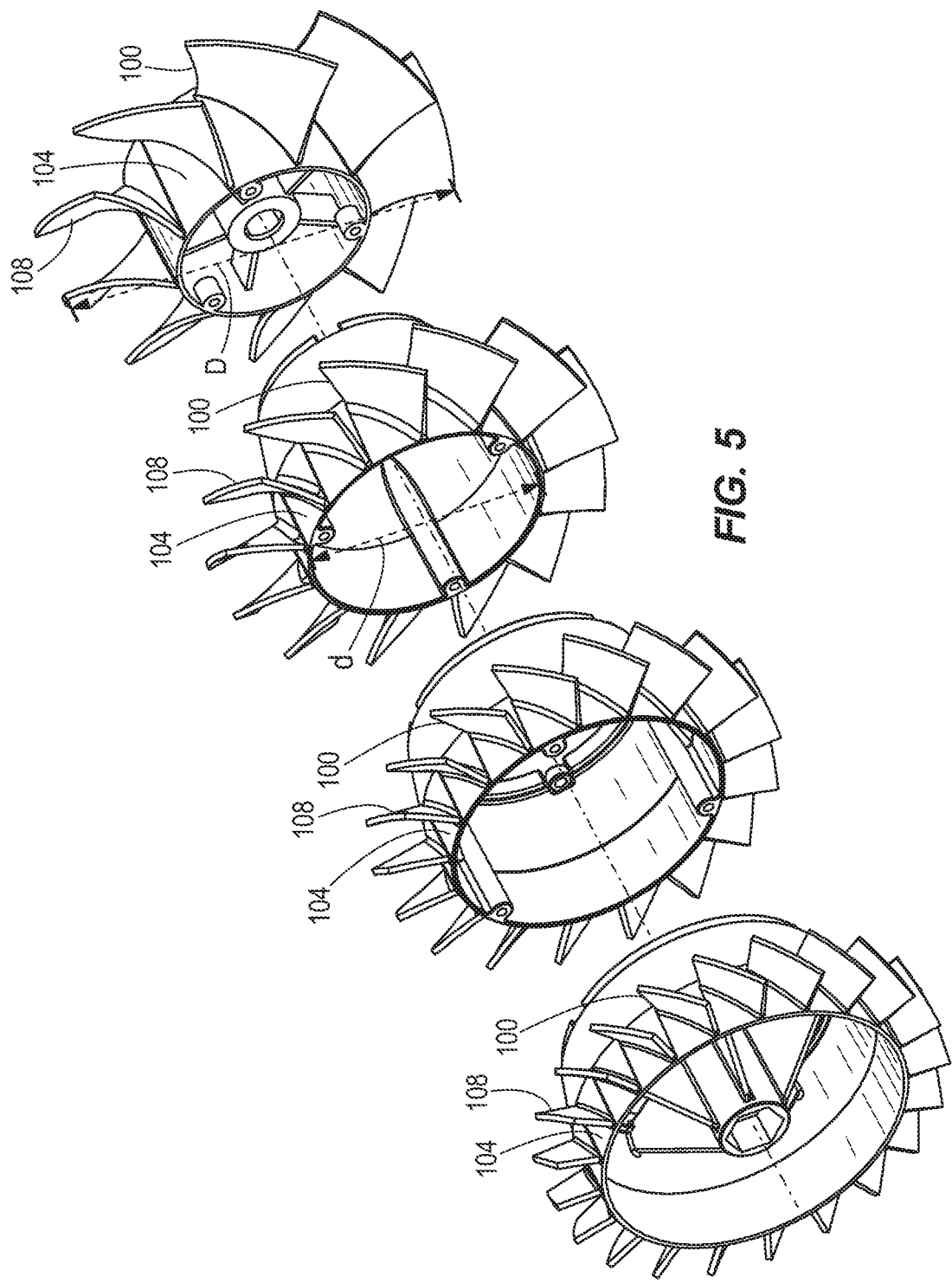
FIG. 5 is a perspective view a plurality of fans of the blower fan assembly of FIG. 2.

With reference to FIGS. 4 and 5, each fan 100 has varying characteristics. In the illustrated embodiment, each fan 100 includes a hub 104 having a different diameter, where the hub diameter of each fan increases along the direction of blower flow. In addition, the blades 108 of each fan 100 decrease in length proportionally to the increase in the hub diameter 108 to maintain a similar outside diameter D between the blades 108 of the various stages 54. In addition, the number of blades 108 on each fan 100 increases moving along the direction of blower flow, while the amount of twist, the axial width, the pitch, and the orientation of the blades for the various stages 54 is altered as well. It should be noted that, while specific examples of varied characteristics of the fans 100 corresponding to relative location were presented, other constructions may be possible and other fan characteristics may be varied.

Figure 7:
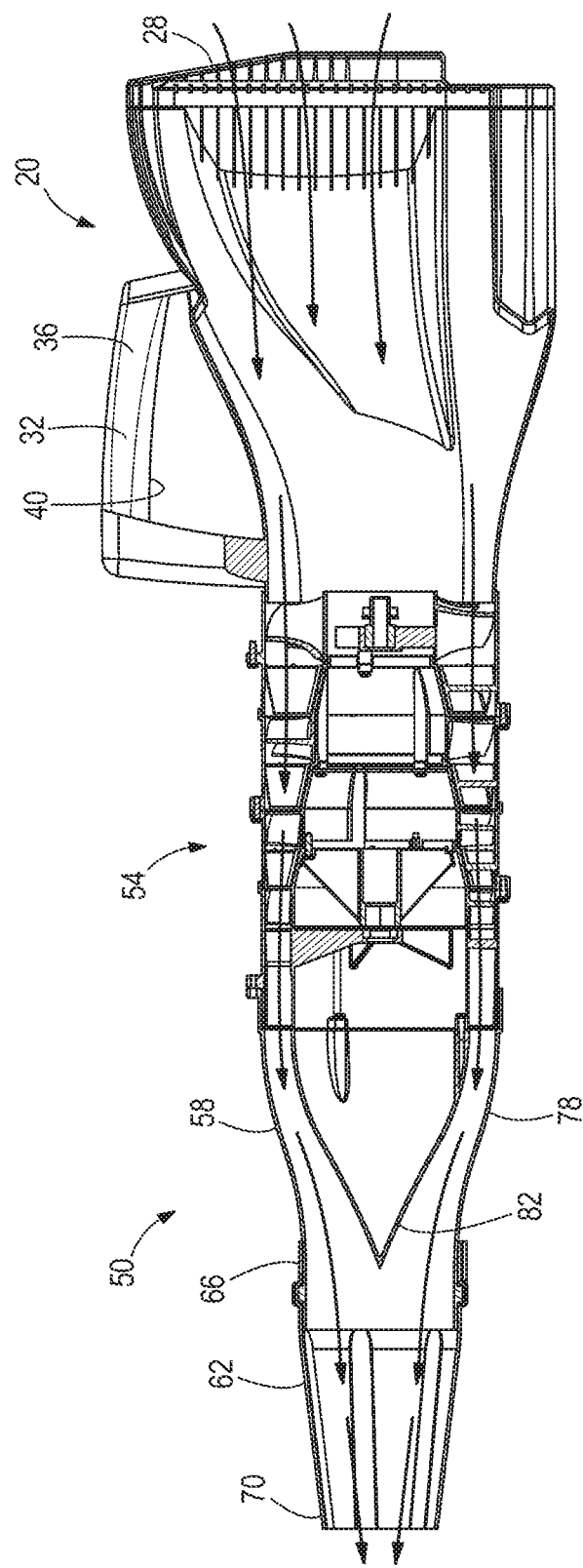
FIG. 7 is a cross section of the axial fan blower shown in FIG. 1.

In operation, a user actuates the trigger 40 to operate the motor to rotate the output shaft, which in turn rotates the input shaft 52 of the blower fan assembly 50 causing rotation of each fan 100. As shown by the flow lines in FIG. 7, the rotation of the fans draws air through the inlet 28 in the main housing 24, and directs the air through each fan stage 54 to increase the pressure of the air. The air then enters the air guide assembly 58 which acts as a converging nozzle to convert the pressure of the air to a higher velocity as the air moves toward the directed air outlet 62 by flowing between the conical housing 78 and the guide cone 82. Finally, the air flows through the directed air outlet 62, exiting in a generally laminar flow at a high velocity.

Figure 8:
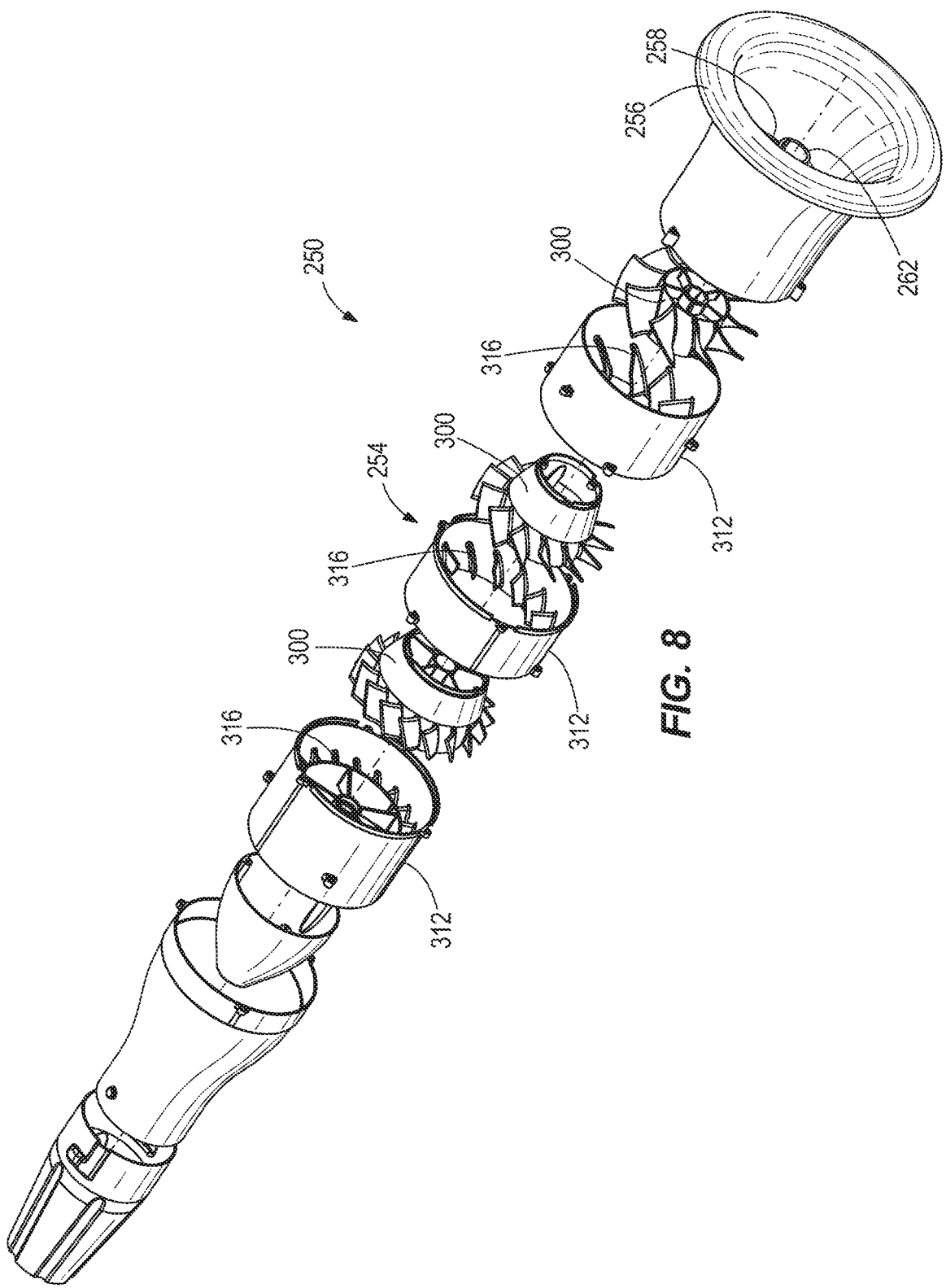
FIG. 8 is an exploded view of another blower fan assembly.
Figure 9:
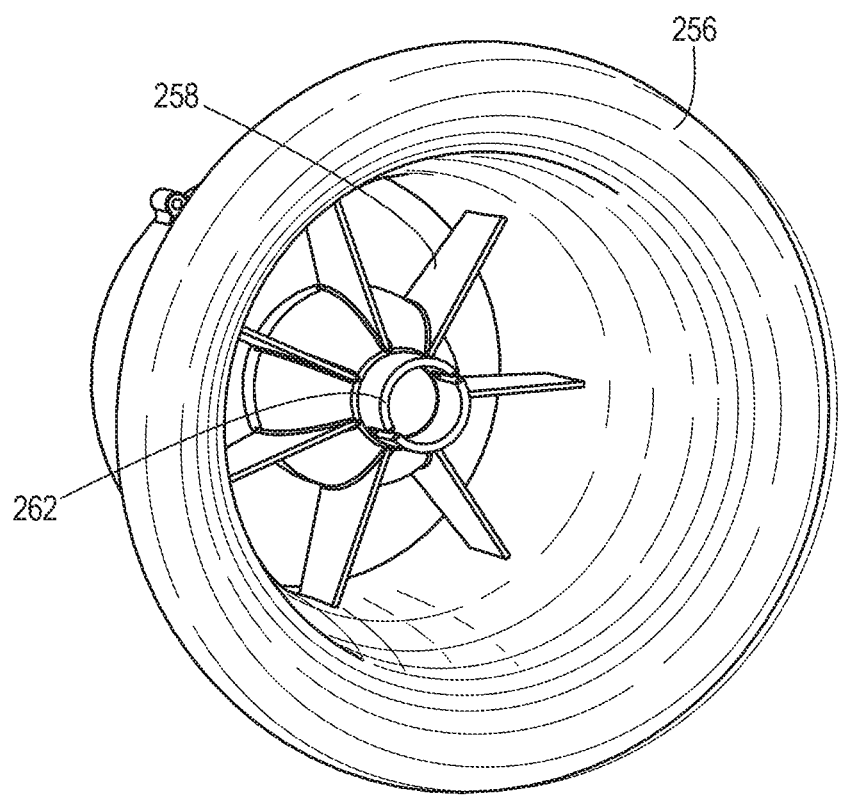
FIG. 9 is a perspective view of an inlet housing of the blower fan assembly of FIG. 8.

In an alternate embodiment of a blower fan assembly 250, shown in FIG. 8, the blower fan assembly includes three fan stages 254 disposed adjacent to an inlet housing 256, where each fan stage 254 includes a fan stage housing 312 having a set of stationary guide vanes 316, and a fan 300 rotatably coupled to the housing 316. The blower assembly 250, and therefore each fan stage 254, includes substantially similar characteristics to those described above in reference to FIGS. 1-7. However, in this construction, the inlet housing 256 of the blower fan 250 includes a set of stationary guide vanes 258 extending radially outwardly from a central hub 262 and positioned upstream of the first rotating fan 300 (FIG. 9). The inlet housing 256 is coupled to the plurality of fan stages 254 on one end and the power unit assembly 20 or other airflow generating source on another end.

Figure 10:
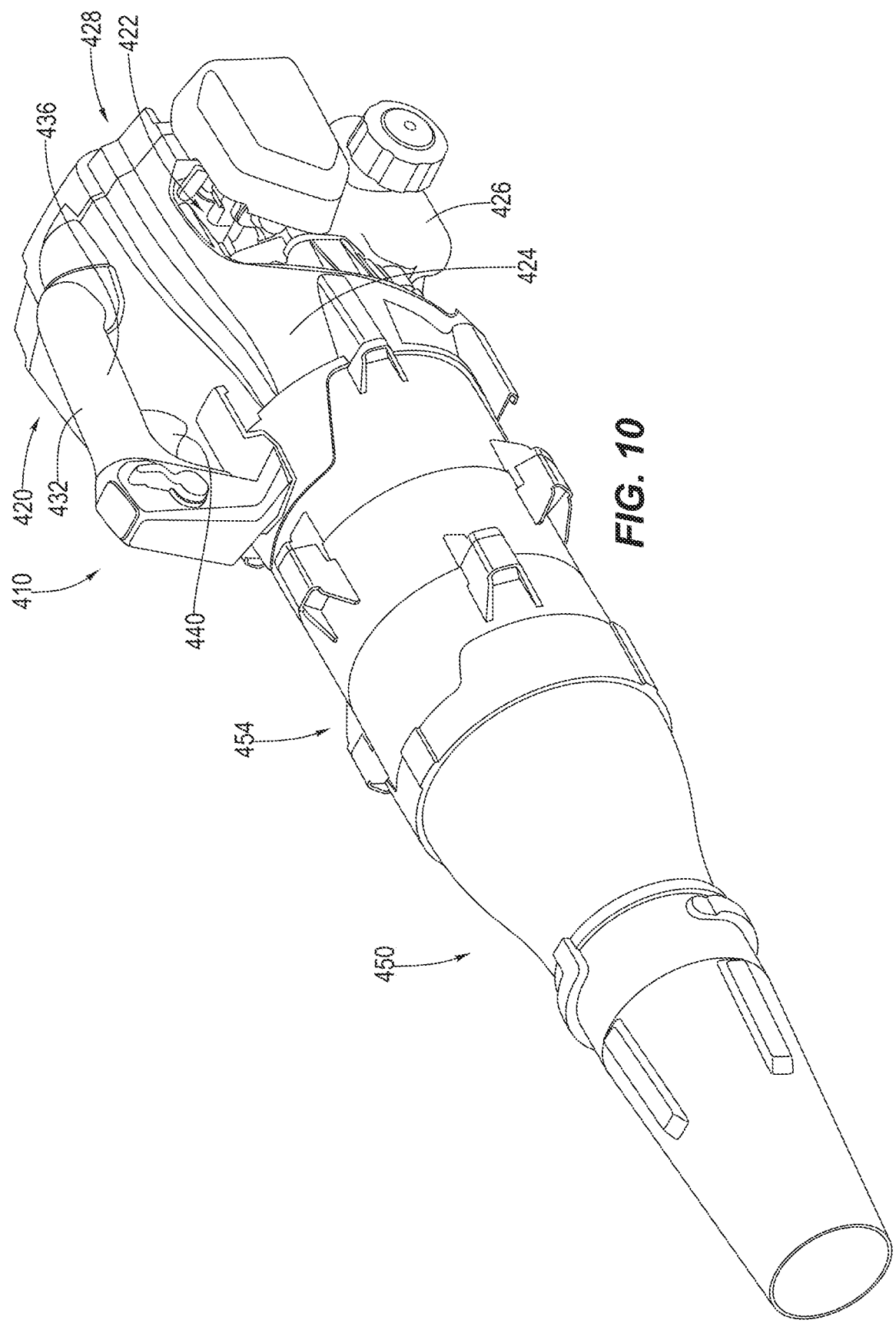
FIG. 10 is a perspective view of another axial fan blower.

FIG. 10 illustrates an axial fan blower 410 according to another embodiment of the invention. The axial fan blower 410 includes a power unit assembly 420 operatively coupled to a blower fan assembly 450 including a plurality of fan stages 454. In this embodiment, the blower fan assembly 450 includes four fan stages 454. As will be described in greater detail below, the axial fan blower 410 is configured to generate directed airflow using the fan stages 454 in which each stage 454 has a fan 500 including specific characteristic properties.

With continued reference to FIG. 10, the power unit assembly 420 includes a motor 422 supported within a main housing 424 having an air inlet 428, a handle 432, and a fuel tank 426. The handle 432 includes a grip 436 having a trigger 440 operatively coupled to the motor. The illustrated motor 422 is a gas powered motor and includes a rotatable output shaft that is coupled to an input shaft 452 of the blower fan assembly 450. In other embodiments, however, the motor 422 may be an electric motor (AC or DC).

FIG. 11 illustrate the blower fan assembly 450 that is coupled (or optionally detachably coupled) to the power unit assembly 420 and includes the plurality of fan stages 454, an air guide assembly 458, and a directed air outlet 462. In the illustrated embodiment, the fan stages 454 are coupled to the power unit assembly 420, and the air guide assembly 458 is disposed between and coupled to the fan stages 454 and the directed air outlet 462.

The directed air outlet 462 includes a first end 466 coupled to the air guide assembly 458 and a second end 470 that is preferably tapered relative to the first end 466. The directed air outlet 462 is detachably coupled to the air guide assembly 458 via at least one coupling member 474 disposed on the first end 466 of the directed air outlet 462. In this construction, the coupling member 474 is shown as a bayonet coupling, with a generally L-shaped slot 474a located on the directed air outlet 462 and a projection on the air guide assembly 458 configured to fit in the L-shaped slot 474a. However, other coupling features have been contemplated as useful.

The air guide assembly 458 includes a generally conical housing 478 disposed circumferentially about a guide cone 482 (FIG. 11), where each of the conical housing 478 and the guide cone 482 are coupled to a housing 512 that includes an adjacent fan stage 454 by, for example, a set of fasteners 490. The conical housing 478 is radially spaced from the guide cone 482 to form an airflow pathway extending from the plurality of fan stages 454 to the directed air outlet 462. In general, the air guide assembly 458 is configured to assist in generating a high velocity, generally laminar airflow at the directed air outlet 462.

With reference to FIGS. 11-14, each of the fan stages 454 includes a fan 500 having a hub 504 and a plurality of blades 508 coupled to the hub 504. Each of the blades 508 defines an inside diameter d and an outside diameter D measured from the center of each hub 504 that cooperate to define an annular flow area. The hubs 504 of adjacent stages 454 are fixedly attached to one another and are coupled to the motor such that operation of the motor rotates the hubs 504 and blades 508. In the illustrated construction, the outside diameter D of the blades 508 of each of the stages 454 are equal (plus or minus 10%) while the inside diameter d of each stage 454 increases in the direction of blower flow. Thus, the annular flow area decreases in the direction of flow when the device is operated as a blower.

Each of the fan stages includes the housing 512 with each housing 512 having substantially the same outside diameter (FIG. 11). The housings 512 are coupled to one another using any suitable attachment means. As shown in FIG. 14, each housing 512 includes a set of stationary guide vanes 516 that are formed as part of the housing 512 or attached to the housing 512. The guide vanes 516 are arranged to receive the air flow from the upstage rotating blades 508 and redirect that air toward the next rotating row of blades 508. Alternatively, the fan stage housing 512 may be formed as a two piece housing that extends the full length of the stages 454.

With continued reference to FIG. 12, the input shaft 452 of the blower fan assembly 450 extends through and is fixedly coupled to the fan 500 or hub 504 closest to the power unit assembly 420. Each fan 500 is also coupled to an adjacent fan 500 by a set of fasteners, thereby rotatably fixing the fans 500 relative to one another. As such, each fan 500 will rotate at the same speed upon rotation of the input shaft 452. In other constructions, the input shaft 452 may extend only part way through the fans 500 or may connect to a fan 500 other than the fan 500 closest to the power unit assembly 420 or to multiple fans 500.

With reference to FIGS. 12 and 13, each fan 500 has varying characteristics. In the illustrated embodiment, each fan 500 includes a hub 504 having a different diameter, where the hub diameter of each fan increases along the direction of blower flow. In addition, the blades 508 of each fan 500 decrease in length proportionally to the increase in the hub diameter 508 to maintain a similar outside diameter D between the blades 508 of the various stages 454. In addition, the number of blades 508 on each fan 500 increases moving along the direction of blower flow, while the amount of twist, the axial width, the pitch, and the orientation of the blades for the various stages 454 is altered as well. In a specific example, the axial width of the blades 508 may decease moving along the direction of blower flow, and the blade twist may increase in the direction of blower flow. It should be noted that, while specific examples of varied characteristics of the fans 500 corresponding to relative location were presented, other constructions may be possible and other fan characteristics may be varied.

In operation, a user starts the motor 422 (e.g., using a pull-start cord, electronic starter, etc.) and actuates the trigger 440 to operate the motor 422 to rotate the output shaft, which in turn rotates the input shaft 452 of the blower fan assembly 450 causing rotation of each fan 500. As shown by the flow lines in FIG. 15, the rotation of the fans draws air through the inlet 428 in the main housing 424, and directs the air through each fan stage 454 to increase the pressure of the air. The air then enters the air guide assembly 458 which acts as a converging nozzle to convert the pressure of the air to a higher velocity as the air moves toward the directed air outlet 462 by flowing between the conical housing 478 and the guide cone 482. Finally, the air flows through the directed air outlet 462, exiting in a generally laminar flow at a high velocity.

In an alternate embodiment of a blower fan assembly 650, shown in FIG. 16, the blower fan assembly is configured as a blower fan attachment. That is, the blower fan assembly 650 is a stand-alone assembly configured to be attached to a generic power source or motor. The blower fan assembly 650 includes three fan stages 654 disposed adjacent to an inlet housing 656, with an input shaft 660 protruding from the inlet housing 656. The input shaft 660 includes a coupling member 664 on an exposed end of the input shaft 660 that is configured to operatively couple the blower fan assembly 650 to a power source (e.g., similar to the motor 422 of the previously described embodiment). On an opposed end, the input shaft 660 is operatively coupled to at least one of the fan stages 654.

Each fan stage 654 includes a fan stage housing 612 having a set of stationary guide vanes 616, and a fan 600 rotatably coupled to the housing 616. The blower assembly 650, and therefore each fan stage 654, includes substantially similar characteristics to those described above in reference to FIGS. 1-7 and 10-16. However, in this construction, the inlet housing 656 of the blower fan 650 includes air inlet 658 formed on the inlet housing 656 positioned upstream of the first rotating fan 600 (FIG. 17). The inlet housing 656 is coupled to the plurality of fan stages 654 on one end and the power unit assembly 20 or other airflow generating source on another end.

The blower fan assembly 50, 250, 450, 650 may be used in other applications outside of a blower (e.g., power unit assembly 20). For example, the fan stages 54, 254, 454, 654 may be incorporated into an HVAC or cooling system, an air drying system, a humidifier, a pump, an industrial exhaust system, a medical device (e.g., aspiration equipment), a workshop dust collection system, a sand blaster, an airbrush, an air reel for agricultural harvesting, or a commercial grain/seed spreader, among others. As such, the fan stages 54, 254, 454, 654 may be configured to generate suction rather than a directed airflow. In such a construction, the fan stages would be operable to direct air in the reverse direction to the flow lines shown in FIG. 7 (e.g., act as a vacuum). Other aspects of the design would remain substantially similar to those described above.

As discussed, each of the various embodiments includes multiple fan stages in which the blades of each progressing stage change. Specifically, when moving in the direction of blower flow, the axial width of each stage of blades narrows. In addition, the amount of twist for each blade reduces in the blower flow direction. Finally, the total number of blades in each stage increases in the direction of blower flow. It should be noted that in some constructions, some or all of these parameters may remain the same for two adjacent rows.

Any feature described and illustrated herein with regard to one embodiment is equally applicable to any other embodiment described herein and should not be limited to that embodiment for which the feature is described.

Various features of the invention are set forth in the following claims.

What is claimed is:

1. A blower comprising:
a motor;
a main housing supporting the motor;
a fan assembly operatively coupled to the motor, the fan assembly including
a fan housing having a first end coupled to the main housing and an opposite, second end,
a first fan stage supported in the fan housing and including a first plurality of stationary vanes and a first fan having a first plurality of blades extending radially outwardly from a first hub, the first hub having a frustoconical shape, when supported in the fan housing, diverging in a direction from the first end toward the second end, the first hub having a first maximum diameter, and
a second fan stage supported in the fan housing and including a second plurality of stationary vanes and a second fan having a second plurality of blades extending radially outwardly from a second hub, the second hub having a second maximum diameter, the second maximum diameter being greater than the first maximum diameter;
an air inlet defined at least partially within the main housing; and
a tapered air outlet that is coupled to the second end of the fan housing,
wherein the fan housing further includes a constant inner diameter along an entire length of the first hub.

2. The blower of claim 1, wherein the first hub has an upstream portion towards the first end and a downstream portion towards the second end, the first plurality of blades being supported on the downstream portion.

3. The blower of claim 1, wherein the second hub has a frustoconical shape, when supported in the fan housing, diverging in the direction from the first end toward the second end.

4. The blower of claim 1, wherein the first plurality of blades includes a first number of blades and the second plurality of blades includes a second number of blades different than the first number.

5. The blower of claim 1, wherein each blade of the first plurality of blades and of the second plurality of blades has a blade length, a blade width, a blade twist, and a blade pitch, and wherein at least one of the blade length, the blade width, the blade twist, and the blade pitch are different between the first plurality of blades and the second plurality of blades.

6. The blower of claim 1, the fan housing includes a first fan housing supporting the first fan stage and a separate second fan housing supporting the second fan stage and connected to the first fan housing.

7. The blower of claim 6, wherein the first plurality of stationary vanes are formed as part of the first fan housing.

8. The blower of claim 7, wherein the first plurality of stationary vanes extend between the first fan housing and an inner ring in an annular passage.

9. The blower of claim 6, wherein the first fan housing includes a first attachment mechanism proximate the first end and a second attachment mechanism circumferentially offset from the first attachment mechanism and toward the second end, the first attachment mechanism and second attachment mechanisms being oriented parallel to a direction of blower flow, the first fan housing being coupled to the main housing by the first attachment mechanism and to the second fan housing by the second attachment mechanism.

10. The blower of claim 1, wherein the fan housing defines a cylindrical passage.

11. The blower of claim 1, wherein the second hub has a frustoconical shape, when supported in the fan housing, diverging in the direction from the first end toward the second end, wherein the fan assembly includes a third fan stage supported in the fan housing and including a third plurality of stationary vanes and a third fan having a third plurality of blades extending radially outwardly from a third hub, the third hub having a frustoconical shape, when supported in the fan housing, diverging in the direction from the first end toward the second end.

12. A blower attachment comprising:
an input shaft rotatable about an axis, the input shaft being operable to be driven by a power unit;
a fan assembly operatively coupled to the input shaft, the fan assembly including
a first fan stage including a first plurality of stationary vanes and a first fan having a first plurality of blades extending radially outwardly from a first hub, and
a second fan stage including a second plurality of stationary vanes and a second fan having a second plurality of blades extending radially outwardly from a second hub, and
a fan housing supporting the first fan stage and the second fan stage, the fan housing having
a cylindrical inner surface having a constant inner diameter defining a passage extending axially along a majority of a distance between an upstream first end toward the input shaft and a downstream second end opposite the first end,
a first annular flow area being defined orthogonal to the axis between the first hub and the cylindrical inner surface of the fan housing at a first axial position, and
a second annular flow area being defined orthogonal to the axis between the second hub and the cylindrical inner surface of the fan housing at a second axial position downstream of the first axial position, the first annular flow area being greater than the second annular flow area; and
a tapered air outlet coupled to the second end, wherein the first hub has a frustoconical shape, when supported in the fan housing, diverging in a direction from the first end toward the second end, and wherein a maximum diameter of the first hub is smaller than a maximum diameter of the second hub.

13. The blower attachment of claim 12, wherein the first axial position is at a first portion of the first hub, and the second axial position is at a second portion of the first hub.

14. The blower attachment of claim 12, wherein the second hub has a frustoconical shape, when supported in the fan housing, diverging in the direction from the first end toward the second end.

15. The blower attachment of claim 12, wherein the second hub has a frustoconical shape, when supported in the fan housing, diverging in the direction from the first end toward the second end, wherein the fan assembly includes a third fan stage supported in the fan housing and including a third plurality of stationary vanes and a third fan having a third plurality of blades extending radially outwardly from a third hub, the third hub having a frustoconical shape, when supported in the fan housing, diverging in the direction from the first end toward the second end.

\* \* \* \* \*